Figure 1:
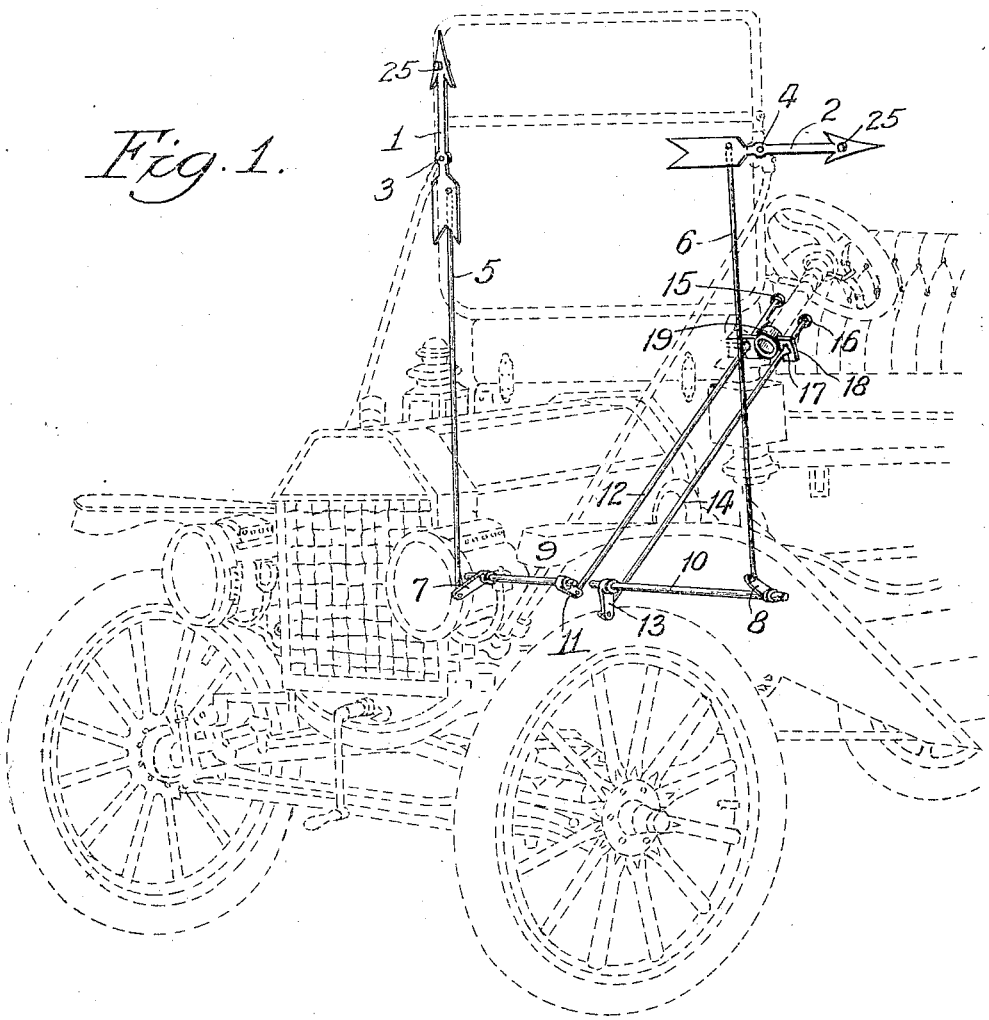

C. W. MURPHY.
AUTOMOBILE SIGNAL.
APPLICATION FILED DEC. 16, 1911.

1,085,287.

Patented Jan. 27, 1914.
2 SHEETS—SHEET 1.

Witnesses:
John Enders,
J. V. Curran.

Inventor:
Charles W. Murphy,
by Wallace R. Lane
Atty.

C. W. MURPHY.
AUTOMOBILE SIGNAL.
APPLICATION FILED DEC. 16, 1911.
1,085,287.
Patented Jan. 27, 1914.
2 SHEETS—SHEET 2.
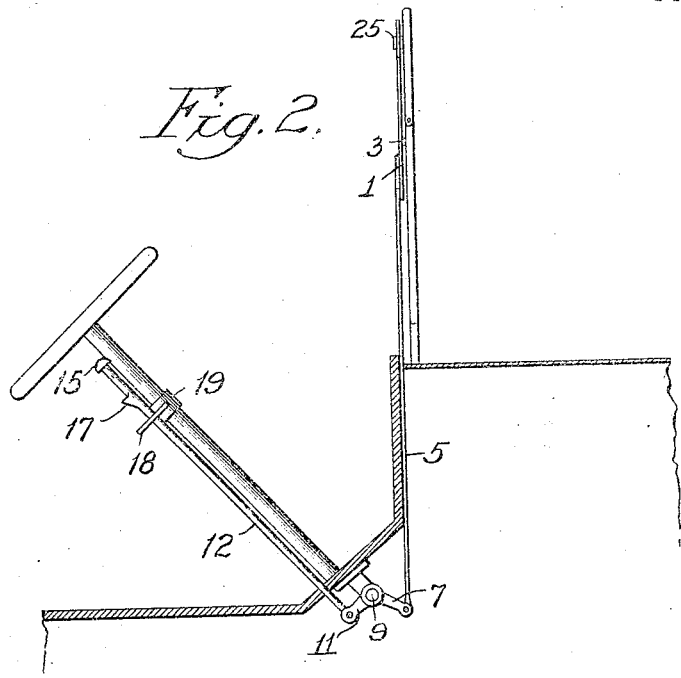
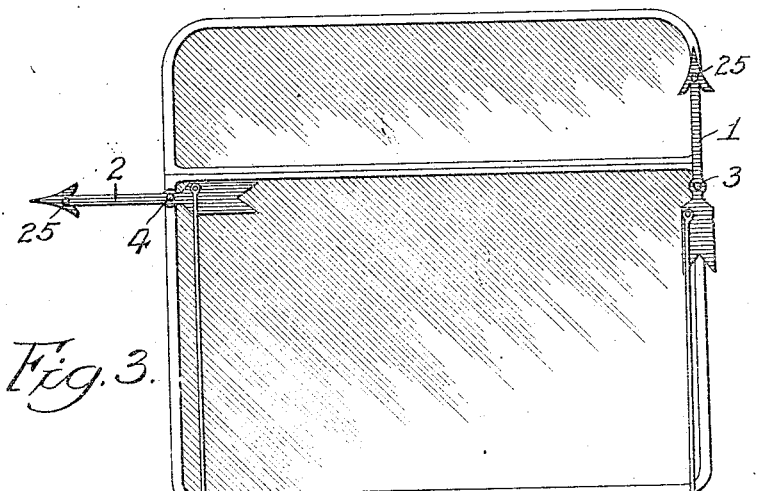
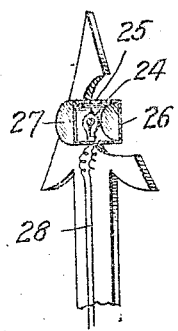
Witnesses:
John Enders,
J. V. Curran.
Inventor:
Charles W. Murphy,
by Wallace R. Lane
Atty.

UNITED STATES PATENT OFFICE.

CHARLES W. MURPHY, OF CHICAGO, ILLINOIS.

AUTOMOBILE-SIGNAL.

1,085,287.  Specification of Letters Patent.  Patented Jan. 27, 1914.

Application filed December 16, 1911. Serial No. 666,207.

*To all whom it may concern:*

Be it known that I, CHARLES W. MURPHY, a citizen of the United States, residing at Chicago, in the county of Cook, State of Illinois, have invented new and useful Improvements in Automobile-Signals, of which the following is a specification.

In handling automobiles on crowded thoroughfares, there has grown up a custom in accordance with which the driver of the machine, when about to turn his machine from its course, holds out his arm on one side or the other of the machine as a signal that he is about to turn the machine in the direction in which his arm is extended. The same signal is also used as an indication that the driver intends to slacken the speed of the machine. In either case, the signal is displayed as a warning to other drivers following closely behind and also to drivers coming from the opposite direction, to traffic policemen, pedestrians and others. In practice, it is often inconvenient for the chauffeur to release his hold on the steering wheel and other parts of the machine in order that he may extend his arm in the manner above set forth.

It is the object of the present invention to provide an automobile with a signaling device, operative from the driver's seat and adapted for indicating by means of suitable pointers or semaphores a contemplated change in the course or management of the machine. To this end the automobile is equipped with a pair of pivoted indicators or pointers provided with control mechanism easily operated by the driver from a point immediately adjacent to the steering wheel of the machine.

If desired, the pointers or semaphores may be equipped with a small electric light, so that the signaling device will be effective in the nighttime as well as in the daytime.

The details of my invention will be better understood by reference to the following detailed description taken in conjunction with the drawings forming a part of this specification.

In the drawings, Figure 1 is a perspective view of one embodiment of my invention, showing the signal device attached to an automobile, which is here indicated by dotted lines; Fig. 2 is a sectional elevation through the machine at the side of the steering wheel; Fig. 3 is a rear elevation of the wind-guard, showing the mounting and connecting devices for the pointers or indicators. Fig. 4 is a perspective view, showing in detail the light carried at the end of the pointer or semaphore.

In the construction shown, the signal device comprises two pointers or indicators 1 and 2, preferably in the shape of arrows and pivotally mounted respectively at 3 and 4 on suitable rigid supports. In the embodiment here shown, these supports are the side members of a wind-shield and the pivots 3 and 4 are located below the hinges of the shield, so that the top portion of the shield may be dropped forward into folded position without in any way disturbing the indicators 1 and 2. When in raised position the hinged portion of the shield conceals in large measure the indicators 1 and 2 and protects them, as will be readily understood.

Connecting rods or links 5 and 6 have their upper ends passed through and pivotally connected with the tail pieces of indicators 1 and 2 and serve as the actuating means whereby those indicators may be thrown into horizontal position or into vertical position, as indicated in Fig. 1. The upper pivotal connection of these links is offset with respect to the pivots 3 and 4, so that there may be no dead center when the indicators are to be moved.

The lower ends of links 5 and 6 are connected respectively through cranks 7 and 8 to a pair of horizontal drive shafts 9 and 10. The former is somewhat shorter than the latter in order that the control mechanism for the driving shafts may be brought up at the sides of the steering post. Drive shaft 9 is actuated through a crank 11, keyed thereto and pivotally connected with a push-rod 12. Similarly drive shaft 10 is actuated by a crank 13, moved through the medium of a push-rod 14. The push-rods 12 and 14 terminate respectively at the upper ends in knobs or handles 15 and 16, arranged preferably on either side of the steering post and in convenient position for manipulation by the driver of the machine. Each of these rods 12 and 14 is equipped with a projecting shoulder 17, (Fig. 2) and both rods passed through holes in a guide-plate 18 secured in suitable manner by a strap or collar 19 encircling the steering post.

Each of the drive shafts 9 and 10 is provided with a coiled spring, numbered respectively 20 and 21, one end of which is firmly attached to the shaft and the other end of which is secured to a suitable collar 22 and 23 (Fig. 3) rigidly mounted on a suitable part of the automobile.

Normally, both pointers or indicators stand vertical and are held in that position by a slight tension in springs 20 and 21. But if the driver of the machine intends to turn his machine to the left, he pushes downward on knob 16 until the tapered projection 17 passes through the slotted plate 18. The control rod 14 then drops or swings forward sufficiently to insure a locking engagement between the projection 17 and the plate 18, preventing the return of the mechanism to its initial position. The downward movement of the push-rod 14 will turn the drive shaft 10 and lift the link 6, thereby swinging the indicator 2 into a horizontal position, as indicated in Fig. 1. During the turning movement of shaft 10 spring 21 is tightened up. After the chauffeur has turned the corner and desires to restore the indicator to its normal or vertical position, it is only necessary for him to reach down and lift or swing the push-rod 14 high enough to let the projection 17 slip by plate 18. The coil spring 21 will then snap the mechanism back to its initial position and the indicator will return to normal.

Each pointer may carry at its outer end a small electric lamp 24, preferably lying in the axis of the indicator and inclosed in a sheet-metal tube 25, the front and rear ends of which are closed respectively by plates or lenses 26 and 27 of glass or other suitable material. Electrical energy may be supplied to this lamp from a storage battery, or other source of power, carried on the automobile through flexible conductors 28 suitably arranged on the indicator.

It will be understood that the pointers or indicators may be of varying size or shape and suitably colored, if desired, and instead of being in the form of arrows, may assume other and unusual shapes, if desired. These and other changes in detail may be made without departing from the spirit of my invention, as defined by the appended claims.

What I claim as new and desire to secure by Letters Patent is:

1. An automobile signal, comprising indicators pivotally mounted on suitable supports and adapted to swing outward respectively at either side of the machine, a link for each indicator pivoted thereto at a point offset with respect to the pivotal mounting of the indicator, a drive shaft for operating each link and connected therewith through a crank, a push-rod operatively connected to move each of said drive shafts, each push-rod having a handle adjacent to the steering wheel of the machine and within easy reach of the driver, a projection on each push-rod forming a latch, a plate for engagement with said projection to hold the push-rod down when the indicator is extended, and a spring operatively connected to restore the push-rod to its initial position when the projection is unlatched from the plate.

2. An automobile signal, comprising indicators pivotally mounted at either side of the machine on suitable supports, said indicators being adapted to swing outward respectively at either side of the machine and each carrying an electric light, visible both from front and rear when the indicator has been swung outward, a link for each indicator pivoted thereto, a drive shaft for operating each link and connected therewith through a crank, a second crank on each shaft, a push-rod operatively connected to each of said last-named cranks, each push-rod having a handle adjacent to the steering wheel of the machine and within easy reach of the driver, a projection on each push-rod forming a latch, a plate for engagement with said projections to hold each push-rod down when its indicator is extended, and a spring operatively connected with each shaft to restore said shaft to its initial position when said projection is unlatched from said plate.

3. An automobile signal comprising a pair of indicators pivotally mounted on both sides of the machine and adapted to swing from a vertical to a horizontal position, a pair of transverse shafts journaled within bearings carried by the machine, a crank carried by the outer ends of each shaft, a vertically extending link connecting each indicator with the said cranks, the said shafts being of unequal length, a crank carried by each of the inner ends of said shaft, a collar carried by the shaft of the steering wheel, a pair of apertured lateral projections carried by said collar, rods mounted within said apertured projections and connected with the crank shafts formed on the inner ends of the transverse cranks, a coil spring encircling each of said transverse shafts, one end of said coil springs being connected to the bearings carried by the machine, and the opposite ends thereof being connected to the transverse shaft, means for holding the indicators when in a horizontal position, and the said coil springs adapted to cause the indicators to assume a vertical position when the holding means has been released, substantially as and for the purpose specified.

In witness whereof, I hereunto subscribe my name to this specification in the presence of two witnesses.

CHARLES W. MURPHY.

Witnesses:
W. R. LANE,
GEO. MANKER.